(12) United States Patent
Wolkerstorfer

(10) Patent No.: US 11,954,052 B2
(45) Date of Patent: Apr. 9, 2024

(54) SIGNAL PROCESSOR, PROCESSOR SYSTEM AND METHOD FOR TRANSFERRING DATA

(71) Applicant: ams AG, Premstätten (AT)

(72) Inventor: Johannes Wolkerstorfer, Premstätten (AT)

(73) Assignee: AMS AG, Premstätten (AT)

( * ) Notice: Subject to any disclaimer, the term of this patent is extended or adjusted under 35 U.S.C. 154(b) by 44 days.

(21) Appl. No.: 17/637,254

(22) PCT Filed: Aug. 20, 2020

(86) PCT No.: PCT/EP2020/073362
§ 371 (c)(1),
(2) Date: Feb. 22, 2022

(87) PCT Pub. No.: WO2021/032849
PCT Pub. Date: Feb. 25, 2021

(65) Prior Publication Data
US 2022/0283966 A1 Sep. 8, 2022

(30) Foreign Application Priority Data
Aug. 22, 2019 (EP) .................................. 19193096

(51) Int. Cl.
*G06F 13/16* (2006.01)
*G06F 9/46* (2006.01)
(Continued)

(52) U.S. Cl.
CPC .......... *G06F 13/1673* (2013.01); *G06F 9/467* (2013.01)

(58) Field of Classification Search
CPC ............................. G06F 13/1673; G06F 9/467
(Continued)

(56) References Cited

U.S. PATENT DOCUMENTS 5,692,211 A * 11/1997 Gulick .................. G06F 13/124
712/35
5,765,025 A 6/1998 Morimoto et al.
(Continued)

FOREIGN PATENT DOCUMENTS

EP 1766510 A1 3/2007

OTHER PUBLICATIONS

European Extended Search Report in corresponding EP Application No. 19193096.5 dated Jan. 22, 2020, 7 pages.
(Continued)

*Primary Examiner* — Chun Kuan Lee
(74) *Attorney, Agent, or Firm* — MH2 TECHNOLOGY LAW GROUP LLP

(57) ABSTRACT

A signal processor is provided, the signal processor comprising a transaction buffer, a processing memory, a processing unit, and a bus connection that is configured to be connected to a bus system for data transmission, wherein the transaction buffer is configured to receive and save a set of data packets from the bus system, the data packets each comprise payload data and attributed address data, where the address data relate to an address of the processing memory, the processing memory is connected with the processing unit, the processing unit is configured to run a process routine, and the transaction buffer is configured to transfer payload data between the processing memory and the transaction buffer at a selectable instant of time during the process routine run by the processing unit. Furthermore, a method for transferring data is provided.

14 Claims, 1 Drawing Sheet

(51) Int. Cl.
*G06F 13/38* (2006.01)
*G06F 15/163* (2006.01)

(58) Field of Classification Search
USPC .......................................... 710/310
See application file for complete search history.

(56) References Cited

U.S. PATENT DOCUMENTS

| | | | | |
|---|---|---|---|---|
| 6,138,176 | A * | 10/2000 | McDonald | G06F 13/124 |
| | | | | 710/6 |
| 6,728,861 | B1 * | 4/2004 | Roach | H04L 47/50 |
| | | | | 710/39 |
| 2012/0105719 | A1 * | 5/2012 | Fratti | H04N 21/8106 |
| | | | | 348/E7.001 |
| 2013/0054726 | A1 * | 2/2013 | Bugge | G06F 9/52 |
| | | | | 709/212 |
| 2014/0258438 | A1 * | 9/2014 | Ayoub | G06F 13/28 |
| | | | | 709/212 |
| 2017/0017591 | A1 * | 1/2017 | Ueda | G06F 13/28 |
| 2018/0004581 | A1 * | 1/2018 | Brown | G06F 13/28 |
| 2018/0018999 | A1 * | 1/2018 | Wu | G09G 5/393 |
| 2018/0081623 | A1 * | 3/2018 | Behrend | G06F 13/4282 |
| 2019/0286589 | A1 * | 9/2019 | Kitamura | G06F 3/0611 |

OTHER PUBLICATIONS

International Search Report and Written Opinion in corresponding International Application No. PCT/EP2020/073362 dated Sep. 30, 2020, 9 pages.
European Office Action in European Application No. 19193096.5 dated Sep. 15, 2022, 4 pages.

* cited by examiner

SIGNAL PROCESSOR, PROCESSOR SYSTEM AND METHOD FOR TRANSFERRING DATA

CROSS-REFERENCE TO RELATED APPLICATIONS

The present application is the national stage entry of International Patent Application No. PCT/EP2020/073362, filed on Aug. 20, 2020, and published as WO 2021/032849 A1 on Feb. 25, 2021, which claims the benefit of priority of European Patent Application No. 19193096.5, filed on Aug. 22, 2019, all of which are incorporated by reference herein in their entirety.

FIELD OF THE INVENTION

The present application relates to a signal processor, to a processor system and to a method for transferring data.

BACKGROUND OF THE INVENTION

Signal processors can be employed for a wide range of applications. It is common to control processes running on a signal processor by a central processing unit connected to the signal processor. In this case a coherent transfer of data between the central processing unit and the signal processor is desired so that data is transferred completely and not only partially. However, a coherent transfer of data between the central processing unit and the signal processor requires an interruption of the processes run by the signal processor. Consequently, the efficiency of the signal processor is reduced.

It is an objective to provide a signal processor with an increased efficiency. It is further an objective to provide an efficient method for transferring data.

These objectives are achieved by the subject matter of the independent claims. Further developments and embodiments are described in dependent claims.

SUMMARY OF THE INVENTION

According to at least one embodiment of the signal processor, the signal processor comprises a transaction buffer. The signal processor can be a digital signal processor. The signal processor can be or can be comprised by an integrated circuit. This means, the signal processor can be comprised by a chip. The signal processor can be an application-specific processor. The transaction buffer is an integral part of the signal processor. The transaction buffer is configured to save data. This means, the transaction buffer can be a memory unit.

The signal processor further comprises a processing memory. The processing memory is configured to save data. The processing memory can be the main memory of the signal processor. This means, the processing memory is employed in processes running on the signal processor. The processing memory is connected with the transaction buffer.

The signal processor further comprises a processing unit. The processing unit can be the main processing unit of the signal processor. The processing unit can be configured to run computational processes or algorithms.

The signal processor further comprises a bus connection that is configured to be connected to a bus system for data transmission. The bus connection can be an input and an output of the signal processor. This means, the signal processor is configured to receive data at the bus connection. The signal processor can further be configured to transfer data via the bus connection. The bus system can be connected with other processors, for example with a central processing unit. Via the bus connection data can be transmitted from the signal processor to the bus system. Furthermore, data can be transmitted from the bus system to the signal processor via the bus connection. The bus system can be any conventional bus system.

The transaction buffer is configured to receive and save a set of data packets from the bus system. The transaction buffer is connected with the bus connection. The set of data packets comprises at least one data packet. The data packets can each comprise the same amount of data. In total, a data packet can comprise at least two words. In this context, "word" refers to a fixed amount of data. The set of data packets can be transferred from another processor connected to the bus system, for example a central processing unit, to the signal processor. The transaction buffer can be configured to receive the set of data packets from the bus connection.

The data packets each comprise payload data and attributed address data, where the address data relate to an address of the processing memory. The payload data can comprise data that is to be saved to the processing memory. For example, the payload data comprise coefficients for a computational algorithm. It is further possible that the payload data comprise information about data to be read from the processing memory. For the payload data of a data packet, the data packet comprises attributed address data. This means, the address data is attributed to the payload data. That the address data relates to an address of the processing memory can mean that the address data comprises an address of the processing memory.

The processing memory is connected with the processing unit.

The processing unit is configured to run a process routine. Running the process routine can comprise processing streams of data. The streams of data can be processed under stringent timing requirements. The processing unit can be configured to transfer data to and from the processing memory during running the process routine.

The transaction buffer is configured to transfer payload data between the processing memory and the transaction buffer at a selectable instant of time during the process routine run by the processing unit. This means, the transaction buffer is configured to transfer payload data from the transaction buffer to the processing memory. The transaction buffer is further configured to receive payload data from the processing memory. The transaction buffer can be configured to transfer payload data based on the attributed address data between the processing memory and the transaction buffer at a selectable instant of time during the process routine run by the processing unit. This means, the payload data of one data packet is transferred to or from the address of the processing memory given by the address data. The process routine run by the processing unit is halted during the transfer of payload data between the processing memory and the transaction buffer. That the transfer of payload data takes place at a selectable instant of time during the process routine can mean that the process routine is interrupted at a selectable instant of time during the process routine for the transfer of payload data. It is further possible that the payload data is transferred between the processing memory and the transaction buffer after the process routine is finished. That the instant of time at which the payload data is transferred is selectable can mean that the instant of time at which the payload data is transferred can be any time during or after running the process routine.

Since the signal processor comprises the transaction buffer, data can be transferred to the signal processor while the process routine is running. Via the bus connection the transaction buffer can receive the set of data packets while the process routine is running. The set of data packets for example comprises information for controlling the signal processor. The signal processor can be controlled by a central processing unit connected to the bus system. The set of data packets received by the transaction buffer is saved by the transaction buffer. This means, for transferring the set of data packets from the bus system to the transaction buffer it is not necessary to interrupt the process routine. As soon as the preselected instant of time during the process routine is reached, payload data can be transferred between the transaction buffer and the processing memory.

Advantageously, the transfer of the set of data packets to the transaction buffer does not interrupt the process routine. Therefore, the duration and the velocity of the transfer of the set of data packets does not influence the efficiency of the processing unit. Once the preselected instant of time is reached, payload data of the set of data packets is transferred between the transaction buffer and the processing memory. This transfer usually requires significantly less time in comparison to the transfer of the set of data packets to the transaction buffer. This means the process routine is interrupted for a shorter time. By employing a transaction buffer the time that the process routine is interrupted can be minimized and the time for running the process routine can be maximized. Overall, the transaction buffer decouples the performance of transferring data to the signal processor from the internal performance of the signal processor. Thus, the signal processor can be operated more efficiently.

Employing the transaction buffer in the signal processor enables to employ an application-specific signal processor with the transaction buffer in combination with a standard central processing unit. The central processing unit can be employed to control the signal processor. In this way, the signal processor can be specialized for high-bandwidth operations and the central processing unit can be configured to carry out control and regulation tasks that are less throughput sensitive. High-bandwidth operations can be operations for continuous monitoring or adaptation of parameters or real time operations. The high-bandwidth operations can be less complex than the operations carried out by the central processing unit. Therefore, the signal processor can be optimized for the less complex but time critical operations. As the signal processor is not required to carry out the more complex operations of the central processing unit, the signal processor can have a simplified design which saves cost.

According to at least one embodiment the processing memory is coupled with the bus connection via the transaction buffer. The processing memory can be coupled with the bus connection exclusively via the transaction buffer. The processing memory is connected with the transaction buffer and the transaction buffer is connected with the bus connection. Consequently, data received at the bus connection can be transferred to the processing memory via the transaction buffer. That the processing memory is coupled with the bus connection via the transaction buffer enables the transfer of payload data between the processing memory and the transaction buffer. In this way, advantageously, the process of receiving the set of data packets by the signal processor is separated from the process of transferring payload data within the signal processor. Therefore, the signal processor can be operated more efficiently.

According to at least one embodiment the transaction buffer is configured to transfer the payload data to the attributed address of the processing memory. This means, for payload data of one data packet the transaction buffer is configured to transfer the payload data to the attributed address of the same data packet. The payload data is then saved in the processing memory. In this way, advantageously, information saved by the processing memory can be altered or updated. For example, coefficients of a Biquad instruction can be updated.

According to at least one embodiment the transaction buffer is configured to transmit payload data saved to the attributed address of the processing memory over the bus connection. This means, the transaction buffer is configured to read payload data from the processing memory and to transmit the read-out payload data over the bus connection. Over the bus connection the payload data can be transmitted to the bus system and therefrom to the central processing unit. The transaction buffer can be configured to transmit payload data saved to the address related to the address data of one data packet received by the transaction buffer. Therefore, the data packets received by the transaction buffer can comprise the information from which address of the processing memory payload data is to be transmitted over the bus connection. Since the payload data is not transmitted directly from the processing memory to the bus connection but via the transaction buffer, the signal processor can be operated efficiently.

According to at least one embodiment the transaction buffer is configured to transfer the payload data of the set of data packets between the processing memory and the transaction buffer in an atomic transaction. This means, in each case the payload data is transferred completely and not only partially. The payload data of the set of data packets can be transferred from the transaction buffer to the processing memory in an atomic transaction. Furthermore, payload data can be transferred from the processing memory to the transaction buffer in an atomic transaction. The transfer in an atomic transaction has the advantage that the payload data is transferred completely. Furthermore, a coherent transfer of data is achieved. This means, multiple words can be transferred in an atomic transaction.

According to at least one embodiment the signal processor further comprises a control register that is configured to indicate if a set of data packets is saved by the transaction buffer. This means, the status of the control register is changed when the transaction buffer receives a set of data packets. The status of the control register is changed again when the transaction buffer transmits payload data to the bus system via the bus connection. In this way, the control register indicates if a set of data packets is saved by the transaction buffer. Therefore, advantageously the transfer of the set of data packets can be monitored by the central processing unit.

According to at least one embodiment the signal processor is configured as an audio signal processor, in particular for an active noise cancellation application. The signal processor can be an active noise cancellation device or it can be comprised by an active noise cancellation device. For active noise cancellation real time adaptation is required. The time critical computations can advantageously be carried out by the signal processor and the more complex operations can be carried out by the central processing unit. In this way, the signal processor can be operated efficiently.

It is further possible that the signal processor is configured as a video signal processor or as a signal processor for a device with a high data through-put.

Furthermore, a processor system is provided. The processor system comprises the signal processor and a central processing unit that is connected to the bus connection of the signal processor via the bus system. The central processing unit can be a microcontroller. The processor system can be operated efficiently, since the signal processor can be employed for time critical operations and the central processing unit can be employed for the more complex operations.

Furthermore, a method for transferring data is provided. The signal processor can preferably be employed for the method for transferring data described herein. This means all features disclosed for the signal processor are also disclosed for the method for transferring data and vice-versa.

According to at least one embodiment of the method for transferring data, the method comprises transferring a set of data packets from a central processing unit to a transaction buffer that is comprised by a signal processor via a bus connection, wherein the data packets each comprise payload data and attributed address data. The set of data packets is transferred by the central processing unit to the bus connection. From the bus connection the set of data packets is transferred to the transaction buffer. The central processing unit and the bus connection can be connected with each other via a bus system so that the set of data packets is transferred from the central processing unit to the bus connection via the bus system. The central processing unit can transfer the set of data packets to the transaction buffer at any time.

The method further comprises running a process routine by a processing unit of the signal processor. Running the process routine can comprise running time critical operations.

The method further comprises transferring payload data between a processing memory of the signal processor and the transaction buffer at a selectable instant of time during the process routine run by the processing unit. This means, payload data can be transferred from the transaction buffer to the processing memory or vice versa.

The transaction buffer is configured to save the set of data packets. The transaction buffer is configured to save the set of data packets until the payload data is transferred to the processing memory. There is no restriction in the timing of the transfer of the set of data packets from the central processing unit to the transaction buffer, since the process routine is not interrupted during the transfer.

The attributed address data relates to an address of the processing memory.

According to at least one embodiment of the method payload data is transferred between the processing memory and the central processing unit via the transaction buffer. The payload data can be transferred between the processing memory and the central processing unit exclusively via the transaction buffer. This means, the payload data transferred between the processing memory and the central processing unit is not directly transferred but only via the transaction buffer. In this way, advantageously, the process routine does not have to be interrupted for the transfer of payload data between the central processing unit and the transaction buffer. Usually, the transfer of payload data between the transaction buffer and the processing memory is significantly faster than the transfer of payload data between the transaction buffer and the central processing unit. Therefore, the interruption of the process routine can be minimized and the signal processor can be operated more efficiently.

According to at least one embodiment of the method payload data is transferred from the transaction buffer to the attributed address of the processing memory. This means, for each data packet the payload data is transferred from the transaction buffer to the address related to the attributed address data of the data packet. In this way, payload data can be transferred from the central processing unit to the processing memory of the signal processor.

According to at least one embodiment of the method payload data is transferred from the attributed address of the processing memory to the transaction buffer. This means, for each data packet payload data is saved to the attributed address of the data packet and is transferred from the processing memory to the transaction buffer. In this way, data can be read out from the processing memory of the signal processor and transferred to the central processing unit.

According to at least one embodiment of the method payload data is transferred between the processing memory and the transaction buffer in an atomic transaction. The transfer in an atomic transaction has the advantage that the payload data is transferred completely. Furthermore, a coherent transfer of data is achieved.

According to at least one embodiment of the method a semaphore provided by the central processing unit to the signal processor indicates the transfer of one set of data packets to the signal processor. The semaphore can be transferred from the central processing unit to the signal processor. The semaphore can be transferred from the central processing unit to the signal processor before the set of data packets is transferred to the signal processor. In this way, the transfer of the set of data packets is indicated.

According to at least one embodiment of the method the semaphore is transferred back to the central processing unit after the transfer of the payload data of the set of data packets between the processing memory and the transaction buffer. It is further possible that the semaphore is transferred back to the central processing unit after payload data is transferred from the transaction buffer to the central processing unit. In this way, the semaphore indicates that the transfer of payload data is finished. It is further possible that an interrupt is sent from the signal processor to the central processing unit before transferring back the semaphore. The interrupt indicates that the payload data was successfully transferred. If payload data was transferred from the transaction buffer to the processing memory, the interrupt indicates that the payload data was successfully transferred to the processing memory. If payload data was transferred from the processing memory to the transaction buffer, the interrupt indicates that the payload data is ready to be transferred from the transaction buffer to the central processing unit. An alternative of transferring a semaphore is to use polling via the bus system. Both alternatives enable the central processing unit to monitor the transfer of the payload data to the signal processor.

The following description of figures may further illustrate and explain exemplary embodiments. Components that are functionally identical or have an identical effect are denoted by identical references. Identical or effectively identical components might be described only with respect to the figures where they occur first. Their description is not necessarily repeated in successive figures.

Figure 2:
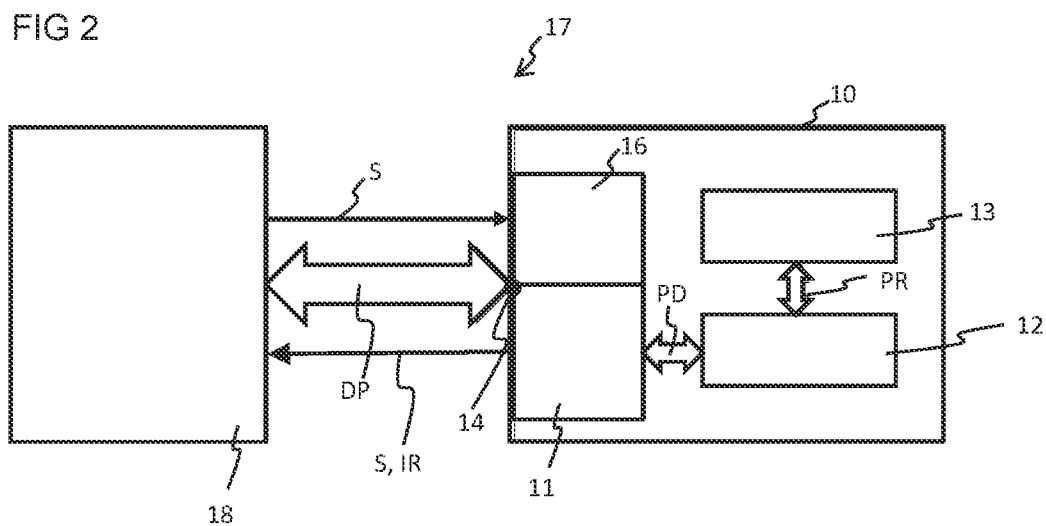

With FIG. 2 another exemplary embodiment of the signal processor and an exemplary embodiment of the method for transferring data are described.

Figure 3:
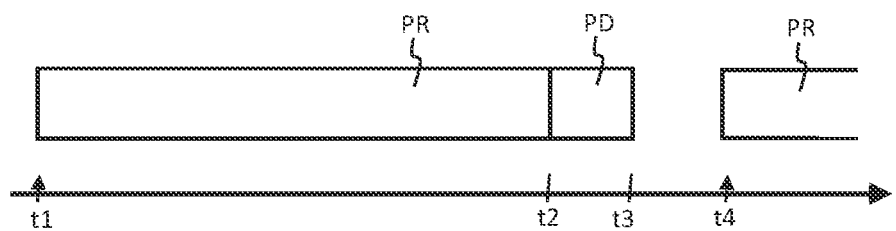

With FIG. 3 another exemplary embodiment of the method for transferring data is described.

DETAILED DESCRIPTION

Figure 1:
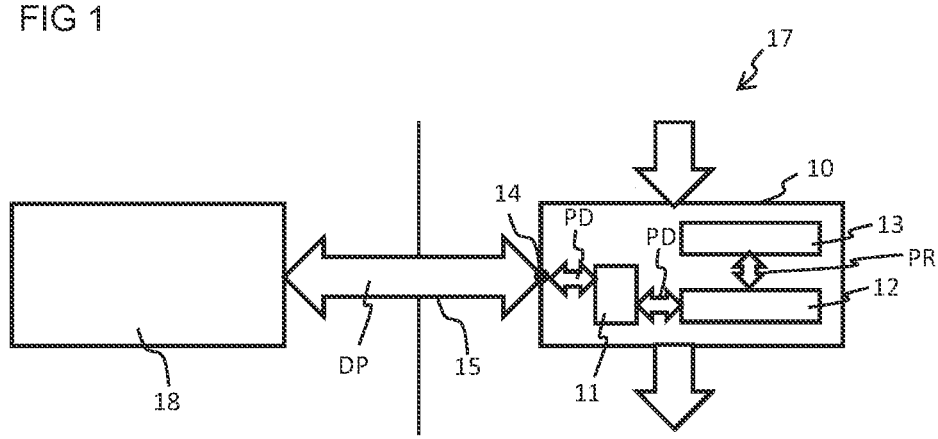
FIG. 1 shows an exemplary embodiment of the signal processor.

FIG. 1 shows an exemplary embodiment of a processor system 17 comprising an exemplary embodiment of a signal processor 10. The processor system 17 further comprises a central processing unit 18 that is connected to a bus connection 14 of the signal processor 10 via a bus system 15.

The signal processor 10 comprises a transaction buffer 11 that is connected with the bus connection 14. The bus connection 14 is connected to the bus system 15 for data transmission. The bus system 15 connects the central processing unit 18 with the signal processor 10. The transaction buffer 11 is configured to receive and save a set of data packets DP from the bus system 15. The signal processor 10 further comprises a processing memory 12 and a processing unit 13. The processing memory 12 is connected with the processing unit 13. This means, the processing memory 12 is coupled with the bus connection 14 via the transaction buffer 11. The processing unit 13 is configured to run a process routine PR. The data packets DP each comprise payload data PD and attributed address data, where the address data relate to an address of the processing memory 12. Furthermore, the transaction buffer 11 is configured to transfer payload data PD between the processing memory 12 and the transaction buffer 11 at a selectable instant of time during the process routine PR run by the processing unit 13. This can mean that the transaction buffer 11 is configured to transfer the payload data PD to the attributed address of the processing memory 12. This can further mean that the transaction buffer 11 is configured to transmit payload data PD saved to the attributed address of the processing memory 12 over the bus connection 14.

The transaction buffer 11 is further configured to transfer the payload data PD of the set of data packets DP between the processing memory 12 and the transaction buffer 11 in an atomic transaction.

The signal processor 10 can be connected with other parts of the processor system 17. Data can be provided to the signal processor 10 from other parts of the processor system 17 which is indicated by the arrow pointing towards the signal processor 10. In addition, data can be transferred from the signal processor 10 to other parts of the processor system 17 which is indicated by the arrow pointing away from the signal processor 10.

The signal processor 10 is configured to carry out high-bandwidth operations, such as operations for continuous monitoring or adaptation of parameters or real time operations. Therefore, the signal processor 10 can be configured as an audio signal processor 10, in particular for an active noise cancellation application. The central processing unit 18 on the other hand is configured to carry out more complex operations and regulation tasks.

In FIG. 2 another embodiment of the processor system 17 comprising another embodiment of the signal processor 10 is shown. The signal processor 10 further comprises a control register 16 that is configured to indicate if a set of data packets DP is saved by the transaction buffer 11.

Furthermore, with FIG. 2 an exemplary embodiment of the method for transferring data is described. The method comprises transferring a set of data packets DP from the central processing unit 18 to the transaction buffer 11 via the bus connection 14. The set of data packets DP comprises several data packets DP. For example, the set of data packets DP comprises at least two data packets DP and at most 128 data packets DP. Each data packet DP comprises payload data PD and attributed address data. The payload data PD for example relates to data to be transferred to the attributed address of the processing memory 12. It is further possible that the payload data PD relates to data read out from the attributed address of the processing memory 12.

In order to indicate the transfer of one set of data packets DP to the signal processor 10, a semaphore S can be provided by the central processing unit 18 to the signal processor 10. The semaphore S can be provided after the transfer of the set of data packets DP.

The method further comprises running the process routine PR by the processing unit 13. The process routine PR can be an audio signal processing program. The process routine PR can be run during the transfer of the set of data packets DP. It is not necessary to interrupt the process routine PR for the transfer of data packets DP. The method further comprises transferring payload data PD between the processing memory 12 and the transaction buffer 11 at a selectable instant of time during the process routine PR run by the processing unit 13. The process routine PR is not run during the transfer of payload data PD between the processing memory 12 and the transaction buffer 11. The instant of time during the process routine PR at which the payload data PD can be transferred can be marked by the signal processor 10. The instant of time during the process routine PR at which the payload data PD is transferred can be selected to be at the end of the process routine PR. This means, payload data PD is transferred between the transaction buffer 11 and the processing memory 12 at the end of the process routine PR for the case that a set of data packets DP is saved to the transaction buffer 11. During the transfer of the payload data PD the interaction between the processing unit 13 and the processing memory 12 pauses.

That payload data PD is transferred between the transaction buffer 11 and the processing memory 12 can mean that payload data PD is transferred from the transaction buffer 11 to the attributed address of the processing memory 12. This means, data is written to the processing memory 12. As an example, by writing data to the processing memory 12 filter coefficients or gain values can be updated. That payload data PD is transferred between the transaction buffer 11 and the processing memory 12 can further mean that payload data PD is transferred from the attributed address of the processing memory 12 to the transaction buffer 11. This means, data is read from the processing memory 12. As an example, by reading data from the processing memory 12 the state of Biquad filters can be read out and transferred to the central processing unit 18. In this way, for example the central processing unit 18 can assess the saturation of audio signals in certain frequency bands. This information can be used to compute adapted filter coefficients.

After the transfer of the payload data PD between the processing memory 12 and the transaction buffer 11 the semaphore S is transferred back to the central processing unit 18. It is further possible that an interrupt IR is sent from the signal processor 10 to the central processing unit 18 before transferring back the semaphore S.

After the transfer of payload data PD between the transaction buffer 11 and the processing memory 12, the process routine PR can be run again. Furthermore, payload data PD can be transferred from the transaction buffer 11 to the central processing unit 18. In this transfer, payload data PD read from the processing memory 12 can be transferred to the central processing unit 18. Therefore, the method enables to transfer payload data PD between the processing memory 12 and the central processing unit 18 via the transaction buffer 11.

With FIG. 3 another exemplary embodiment of the method for transferring data is described. On the axis shown in FIG. 3 the time is plotted. Between a first instant of time t1 and a second instant of time t2 the process routine PR is running. At the end of the process routine PR payload data PD is transferred between the transaction buffer 11 and the processing memory 12. The payload data PD of each data packet DP is transferred within one cycle. In an additional cycle information for decoding the payload data PD is transferred. The payload data PD is transferred between the second instant of time t2 and a third instant of time t3. At a fourth instant of time t4 the process routine PR starts to run again.

In this way, payload data PD can be transferred to the processing memory 12 in an efficient way. If the payload data PD was transferred directly from the central processing unit 18 to the processing memory 12, significantly more cycles would be required. Therefore, the process routine PR would be interrupted for a significantly longer time. Therefore, by employing the transaction buffer 11 the transmission of payload data PD is optimized. Furthermore, the payload data PD can be transferred between the processing memory 12 and the transaction buffer 11 in an atomic transaction. In this way, a partial transfer of data is avoided and several words can be transferred coherently.

The invention claimed is:

1. A signal processor comprising:
   a transaction buffer,
   a processing memory,
   a processing unit, and
   a bus connection that is configured to be connected to a bus system for data transmission, wherein
   the transaction buffer is configured to receive and save a set of data packets from the bus system,
   the data packets each comprise payload data and attributed address data, where the address data relate to an address of the processing memory,
   the processing memory is connected with the processing unit,
   the processing unit is configured to run a process routine,
   the transaction buffer is configured to transfer payload data (PD) between the processing memory and the transaction buffer at a selectable instant of time during the process routine run by the processing unit, and
   the transaction buffer is configured to transfer payload data saved to the attributed address of the processing memory to the transaction buffer.

2. The signal processor according to claim 1, wherein the processing memory is coupled with the bus connection via the transaction buffer.

3. The signal processor according to claim 1, wherein the transaction buffer is configured to transfer the payload data to the attributed address of the processing memory.

4. The signal processor according to claim 1, wherein the transaction buffer is configured to transfer the payload data of the set of data packets (DP) between the processing memory and the transaction buffer in an atomic transaction.

5. The signal processor according to claim 1, further comprising a control register that is configured to indicate if a set of data packets is saved by the transaction buffer.

6. The signal processor according to claim 1, wherein the signal processor is configured as an audio signal processor, in particular for an active noise cancellation application.

7. A processor system comprising the signal processor according to claim 1 and a central processing unit that is connected to the bus connection of the signal processor via the bus system.

8. A method for transferring data, the method comprising:
   transferring a set of data packets from a central processing unit to a transaction buffer that is comprised by a signal processor via a bus connection, wherein the data packets each comprise payload data and attributed address data,
   running a process routine by a processing unit of the signal processor, and
   transferring payload data between a processing memory of the signal processor and the transaction buffer at a selectable instant of time during the process routine run by the processing unit, wherein
   the transaction buffer is configured to save the set of data packets,
   the attributed address data relates to an address of the processing memory, and
   payload data is transferred from the attributed address of the processing memory to the transaction buffer.

9. The method according to claim 8, wherein payload data is transferred between the processing memory and the central processing unit via the transaction buffer.

10. The method according to claim 8, wherein payload data is transferred from the transaction buffer to the attributed address of the processing memory.

11. The method according to claim 8, wherein payload data is transferred between the processing memory and the transaction buffer in an atomic transaction.

12. The method according to claim 8, wherein a semaphore provided by the central processing unit to the signal processor indicates the transfer of one set of data packets to the signal processor.

13. The method according to claim 12, wherein the semaphore is transferred back to the central processing unit after the transfer of the payload data of the set of data packets between the processing memory and the transaction buffer.

14. A signal processor comprising:
   a transaction buffer,
   a processing memory,
   a processing unit, and
   a bus connection that is configured to be connected to a bus system for data transmission, wherein
   the transaction buffer is configured to receive and save a set of data packets from the bus system,
   the data packets each comprise payload data and attributed address data, where the address data relate to an address of the processing memory,
   the processing memory is connected with the processing unit,
   the processing unit is configured to run a process routine,
   the transaction buffer is configured to transfer payload data (PD) between the processing memory and the transaction buffer at a selectable instant of time during the process routine run by the processing unit,
   the transaction buffer is configured to transfer payload data saved to the attributed address of the processing memory to the transaction buffer, and
   a control register that is configured to indicate if a set of data packets is saved by the transaction buffer.

* * * * *